US012573847B2

(12) United States Patent
Robina et al.

(10) Patent No.: US 12,573,847 B2
(45) Date of Patent: Mar. 10, 2026

(54) ENERGY STORAGE SYSTEM FOR A DIRECT CURRENT TRANSMISSION SYSTEM AND A METHOD FOR EXCHANGING ENERGY WITH A DIRECT CURRENT TRANSMISSION SYSTEM

(71) Applicant: Hitachi Energy Ltd, Zürich (CH)

(72) Inventors: Pablo Montero Robina, Seville (ES); Frans Dijkhuizen, Skultuna (SE); Bertil Berggren, Västerås (SE); Nicklas Johansson, Västerås (SE); Roberto Alves, Västerås (SE); Ali Tayyebi, Västerås (SE)

(73) Assignee: Hitachi Energy Ltd, Zurich (CH)

( * ) Notice: Subject to any disclaimer, the term of this patent is extended or adjusted under 35 U.S.C. 154(b) by 0 days.

(21) Appl. No.: 19/133,631

(22) PCT Filed: Dec. 8, 2023

(86) PCT No.: PCT/EP2023/084819
§ 371 (c)(1),
(2) Date: May 28, 2025

(87) PCT Pub. No.: WO2024/121355
PCT Pub. Date: Jun. 13, 2024

(65) Prior Publication Data
US 2026/0012018 A1 Jan. 8, 2026

(30) Foreign Application Priority Data
Dec. 8, 2022 (EP) .................................... 22212282

(51) Int. Cl.
*H02J 1/08* (2006.01)
*G06F 1/26* (2006.01)
(Continued)

(52) U.S. Cl.
CPC ................ *H02J 3/24* (2013.01); *G06F 1/263* (2013.01); *H02J 7/0068* (2013.01); *H02J 2207/20* (2020.01)

(58) Field of Classification Search
CPC ........ H02J 3/24; H02J 7/0068; H02J 2207/20; G06F 1/263
See application file for complete search history.

(56) References Cited

U.S. PATENT DOCUMENTS 9,484,808 B2 11/2016 Norrga
11,146,079 B2 10/2021 Fishman et al.
(Continued)

FOREIGN PATENT DOCUMENTS

CN 101992678 A 3/2011
CN 104052075 A 9/2014
(Continued)

OTHER PUBLICATIONS

Electrial Power System including energy storage modules and shared system controller (Year: 2019).*
(Continued)

*Primary Examiner* — Rexford N Barnie
*Assistant Examiner* — Terrence R Willoughby
(74) *Attorney, Agent, or Firm* — PROCOPIO, CORY, HARGREAVES & SAVITCH LLP

(57) ABSTRACT

There is disclosed herein an energy storage system for a direct current (DC) transmission system, the energy storage system being configured to be connected to a DC link. The energy storage system comprises a first system terminal, a second system terminal, a first converter connected to the first system terminal, and a second converter connected to the first converter and the second system terminal. The energy storage system further comprises an AC loop device providing an alternating current (AC) path, and a plurality of
(Continued)

energy storage devices connected in parallel with the second converter comprising a cell having power electronic switches, and an energy storage element connected to the cell, wherein the cells are individually switchable. The present disclosure further relates to a method for providing energy storage to a DC transmission system.

15 Claims, 5 Drawing Sheets

(51) Int. Cl.
| | |
|---|---|
| *H02J 1/14* | (2006.01) |
| *H02J 3/24* | (2006.01) |
| *H02J 3/32* | (2006.01) |
| *H02J 7/00* | (2006.01) |

(56) References Cited

U.S. PATENT DOCUMENTS

| | | | | |
|---|---|---|---|---|
| 2016/0118830 | A1* | 4/2016 | Jeon | B60L 58/22 |
| | | | | 320/127 |
| 2019/0123676 | A1* | 4/2019 | Yi | B60L 50/50 |
| 2019/0372361 | A1* | 12/2019 | Fishman | H02M 3/285 |
| 2020/0287391 | A1* | 9/2020 | Won | H02J 3/32 |
| 2022/0360086 | A1 | 11/2022 | Zhou et al. | |
| 2023/0420956 | A1* | 12/2023 | Wu | H02J 7/0016 |
| 2024/0136841 | A1* | 4/2024 | Zhang | H02J 7/345 |

FOREIGN PATENT DOCUMENTS

| | | | | |
|---|---|---|---|---|
| CN | 104283250 | A | 1/2015 | |
| CN | 114499267 | A | 5/2022 | |
| CN | 117013841 | A | 11/2023 | |
| EP | 3573207 | A1 * | 11/2019 | ............... H03K 3/45 |
| WO | 2020102373 | A1 | 5/2020 | |

OTHER PUBLICATIONS

Zhang et al., "A Control Modeling of Bidirectional DC/DC for Energy Storage System and its Rapid Implementation", Journal of Tongji University (Natural Science), DOI : 10.3969/j, issn. 0253-374x, Sep. 17, 2009, vol. 37, No. 9 , 6 pages.

ISA/EPO, International Search Report and Written Opinion issued in PCT/EP2023/084819, mailed Mar. 4, 2024, 9 pages.

Ferreira, "Nestled Secondary Power Loops in Multilevel Modular Converters", Workshop on Control and Modeling for Power Electronics (COMPEL), 2014, 9 pages.

Páez et al., "Overview of DC-DC Converters Dedicated to HVdc Grids", IEEE Transactions on Power Delivery, vol. 34, No. 1, Feb. 2019, p. 119-128.

Adam et al., "Review of dc-dc converters for multi-terminal HVDC transmission networks", IET Power Electronics, Special Issue on Converters and Semiconductor Circuit Breakers for HVDC and DC Grids, 2016, vol. 9, Iss. 2, pp. 281-296.

Ferreira, "The Multilevel Modular DC Converter", IEEE Transactions on Power Electronics, vol. 28, No. 10, Oct. 2013, 4460-4465.

* cited by examiner

ENERGY STORAGE SYSTEM FOR A DIRECT CURRENT TRANSMISSION SYSTEM AND A METHOD FOR EXCHANGING ENERGY WITH A DIRECT CURRENT TRANSMISSION SYSTEM

CROSS-REFERENCE TO RELATED APPLICATIONS

The present application is a national stage entry of International Patent Application No. PCT/EP2023/084819, filed on Dec. 8, 2023, which claims priority to European Patent Application No. 22212282.2, filed on Dec. 8, 2022, which are both hereby incorporated herein by reference as if set forth in full.

TECHNICAL FIELD

The present disclosure relates to an energy storage system for a direct current transmission system, and a method for storing energy in a direct current transmission system.

BACKGROUND

The increasing amount of renewable power production in the power grid system results in an increase of power sources such as wind power and solar power. A consequence of the increase of renewable power sources, replacing conventional power production resources, is the reduction of the inertia in the power system. A reduction of inertia results in a power grid that is less stable and worse at handling sudden changes in the power consumption or production. Such change can for example be a power failure for a big consumer or producer.

To support the inertia of the power system inertia emulation through power electronics has been used. One example of such inertia emulation is through power electronic converters, such as an AC-DC converter that behave like a synchronous machine, where a DC-DC converter is placed on the DC-side to interface with an energy storage. By providing the power electronic converters with an energy storage capability, they are able to extract or inject power into the power system to imitate inertia.

However, the existing DC-DC converters with energy storage capability have a lack in flexibility of how they may be designed. There is a need of a DC-DC converter with a higher availability and reliability for the power grid. Furthermore, there is a need of a DC-DC converter with higher power transmission capabilities and with less stress on the converters.

SUMMARY

In view of the above, it is an object of the present disclosure to provide an improved energy storage system for a direct current transmission system.

It is also an object of the present disclosure to provide an energy storage system that is more flexible in its design and that have higher power transmission capabilities.

A further object is to provide an energy storage system with a higher reliability and availability.

An object of the present disclosure is also to provide a more cost-efficient energy storage system.

To achieve at least one of the above objects, and also other objects that will be evident from the following description, an energy storage system defined in claim 1 is provided according to the present disclosure. Preferred variants of the energy storage system will be evident from the dependent claims.

More specifically, there is provided, according to a first aspect of the present disclosure, an energy storage system, ESS, for a direct current, DC, transmission system, the energy storage system being configured to be connected to a DC link of the DC transmission system. The energy storage system comprises a first system terminal and a second system terminal, a first converter connected to the first system terminal, a second converter connected to the first converter and the second system terminal, an alternating current, AC, loop device connected to the first system terminal and to the second system terminal and in parallel with the first and second converters, the AC loop device providing an AC path, and a plurality of energy storage devices connected in parallel with the second converter and in series with the first converter. Each energy storage device comprises a cell having power electronic switches, and an energy storage element connected to the cell, wherein the cells are individually switchable.

By providing the plurality of energy storage devices in parallel with the second converter it is possible to control the power exchange with the DC transmission system in a flexible way. For instance, the DC voltage across the plurality of energy storage devices can be controlled to be considerably lower than the full DC voltage of the DC transmission system, and the number of energy storage devices can be kept at a reasonable level. Still due to the individual switching of the cells of the energy storage devices, the voltage delivered by the energy storage system will have a low dependency on the lowest allowed state of charge of the energy storage devices. Thus, a degree of freedom is introduced for the energy storage system.

The energy storage system may be used in either a Medium Voltage Direct Current, MVDC, transmission system or in a High Voltage Direct Current, HVDC, transmission system. By connecting the energy storage system to the DC link it is possible to provide energy supporting functions such as absorbing energy by charging when there is surplus power in the DC transmission system or to discharge and provide power to the DC transmission system when there is a shortage of power.

The first converter as well as the second converter may be a full-bridge arrangement or a half-bridge arrangement, or combinations thereof.

The energy storage system may further comprise an energy storage device controller. The first and second converters may be configured to control a first direct current, DC, voltage between the first and second system terminals, a second DC voltage between their interconnection point and the second system terminal, and first and second alternating current, AC, voltages across the first and second converters (30, 40), respectively. The energy storage device controller may be configured to control each cell to insert or bypass the energy storage element such that a power exchange with the plurality of energy storage devices is controlled and such that an energy storage voltage, being a total output voltage of the plurality of energy storage devices, is adapted to the second DC voltage and the second AC voltage.

The energy storage device controller provides an improved control of the energy storage devices. The energy storage device controller may control the energy storage devices based on information such as state of charge of each energy storage device, or/and the power balance in the DC transmission system. The energy storage device controller may be capable of communicating with other components in the DC transmission system if needed. One example of such component could be a chopper resistor controller. It may be advantageous to use information from other components to achieve an efficient control of the energy storage system.

At least one of the first and second converters may generate an AC current that may be allowed to circulate through the first and second converters and the AC loop device.

The AC current may be advantageous as it provides power balancing between the first converter and the second converter.

Each of the first and second converters may be a modular multilevel converter.

A modular multilevel converter is an example of an advanced voltage source converter that is suitable for operating in the energy storage system. A modular multilevel converter is advantageous as it has a high quality of the output performance and low requirements on voltage and current rating demands for the power switches.

The AC loop device may comprise at least one of an arrangement of passive elements, and an arrangement of active elements.

With the combined elements of the AC loop device a filter is provided. The filter may be tuned at the AC frequency of the circulating AC current to provide a path for the circulating AC current by providing a low impedance passage for that AC current. Examples of passive elements are inductors and capacitors, and examples of passive elements are cells.

Each energy storage element may be a super capacitor and/or a battery.

Super capacitors and batteries are suitable for acting in an energy storage system in a DC transmission system. Super capacitors may be suitable in a DC transmission system where a high quick burst of power is required from the energy storage devices. Super capacitors have a rapid charge and discharge time which result in that super capacitors can provide a burst of power when there is a shortage in a DC transmission system. Super capacitors are also suitable in energy storage systems where the temperature differs, super capacitors may operate in a wide range of temperatures.

In a DC transmission system where there is a need that the energy storage system provide power over a longer period of time, batteries may be suitable. Batteries are able to store relatively big volumes of energy with a low loss over time.

The energy storage system may further comprise comprising a braking device comprising a braking resistor arranged in parallel to the plurality of energy storage devices, and a switching structure comprising a first switch connected in series with the plurality of energy storage devices, and a second switch connected in parallel to the braking resistor.

In a case where the energy storage devices already have a state of charge of 100% and there is excess energy in the DC transmission system it is advantageous if the energy storage system is able to dissipate power from the DC transmission system. The resistor and the switching structures allow for such braking operation of the DC transmission system by switching such that the current is directed through the resistor. Thereby, the energy storage system is able to dissipate power also when the state of charge of the energy storage devices is 100%.

The energy storage system may further comprise comprising a braking device comprising a braking resistor arranged in parallel to the plurality of energy storage devices, and a switching structure comprising a first switch, connected in series with the plurality of energy storage devices, and power electronic switches, wherein the power electronic switches are connected in series with the braking resistor.

The plurality of energy storage devices may comprise a branch of several energy storage devices connected in series.

By connecting several energy storage devices in series, the voltage provided by the energy storage system may be varied to be adapted to the voltage of the DC transmission system. With several energy storage devices in series, it is also possible to design the energy storage system to be applicable in different designs of DC transmission systems. As an example, the energy storage system may be designed with the number of energy storage devices needed in series as a branch to achieve the required voltage rating. To adapt the energy storage system to the energy storage requirements of the DC transmission system there may be several branches with energy storage devices in series connected in parallel.

The energy storage may further comprise an alternating current, AC, rejecting circuit connected in series with the plurality of energy storage devices between the energy storage devices and the first and second converters.

An AC rejecting circuit may be used to avoid that the AC current enters the energy storage devices. The AC rejecting circuit may be advantageous as it provides a protection of the energy storage devices and also remove the must that the DC ESS voltage follows the AC voltage to restrict the AC current from entering the energy storage devices. The AC rejecting circuit may be designed as a trap filter with an inductor and a capacitor connected in parallel.

The DC link may have a first pole and a second pole. The energy storage system may further comprise a third converter, a fourth converter and a further plurality of energy storage devices, which are interconnected similar to the first converter, the second converter and the plurality of energy storage devices, and comprise a third system terminal and a fourth system terminal, similar to the first and second system terminals, respectively, wherein the first system terminal is connected to the first pole, the second system terminal to ground, the third system terminal is connected to the second pole, and the fourth system terminal is connected to ground.

The third converter, fourth converter and further plurality of energy storage devices allows the energy storage system to act in not only monopolar DC links but also in bipolar DC links and homopolar DC links. Thus, extra flexibility of where the energy storage system may be used is introduced. When the energy storage system is grounded it also allows for independent operation of each pole when attached to bipolar DC link.

According to a second aspect of the present disclosure a method for exchanging energy with a direct current, DC, transmission system, by means of an energy storage system configured to be connected to a DC link of the DC transmission system is provided. The energy storage system comprises; a first system terminal and a second system terminal, a first converter connected to the first system terminal, a second converter connected to the first converter and the second system terminal, an AC loop device connected to the first system terminal and to the second system terminal and in parallel with the first and second converter, the AC loop device providing an alternating current, AC, path, and a plurality of energy storage devices connected in parallel with the second converter and in series with the first converter. Each energy storage device comprises a cell having power electronic switches, and an energy storage element connected to the cell, wherein the cells are individually switchable. The method comprising absorbing energy from the DC transmission system by controlling at least one of the plurality of energy storage devices to absorb energy in the energy storage element and releasing electrical energy to the DC transmission system from the energy storage system by controlling at least one of the energy storage devices to release energy from the energy storage element.

Effects and features of the second aspect may be largely analogous to those described above in connection with the first aspect. Embodiments mentioned in relation to the first aspect may be at least largely compatible with the second aspect. It is further noted that the present disclosure relates to all possible combinations of features unless explicitly stated otherwise.

The method may further comprise controlling a first DC voltage between the first and second system terminals and a second DC voltage between an interconnection point of the first and second converters and the second system terminal by means of the first and second converters, controlling a first AC voltage across the first converter and a second AC voltage across the second converter, and controlling each cell to insert or bypass the energy storage element such that a power exchange with the plurality of energy storage devices is controlled and such that a total output voltage of the plurality of energy storage devices is adapted to the second DC voltage and the second AC voltage.

The method may further comprise generating an AC current and circulating the AC current through the first and second converters and the AC loop device.

The method may further comprise controlling a total voltage across the energy storage devices to follow the variations of an amplitude of a modulated AC voltage across the second converter.

By following the AC voltage across the second converter it is avoided that the AC current enters the energy storage devices. This step is advantageous as it allows a design of the energy storage system with a limited or no AC restricting circuit, or that the AC restricting circuit is replaced by a DC choke.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that the present disclosure is not limited to the particular component parts of the device described or steps of the methods described as such device and method may vary. It is also to be understood that the terminology used herein is for purpose of describing particular embodiments only, and is not intended to be limiting.

BRIEF DESCRIPTION OF THE DRAWINGS

The present disclosure will by way of example be described in more detail with reference to the appended drawings, which show example embodiments of the disclosure.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person.

Figure 1:
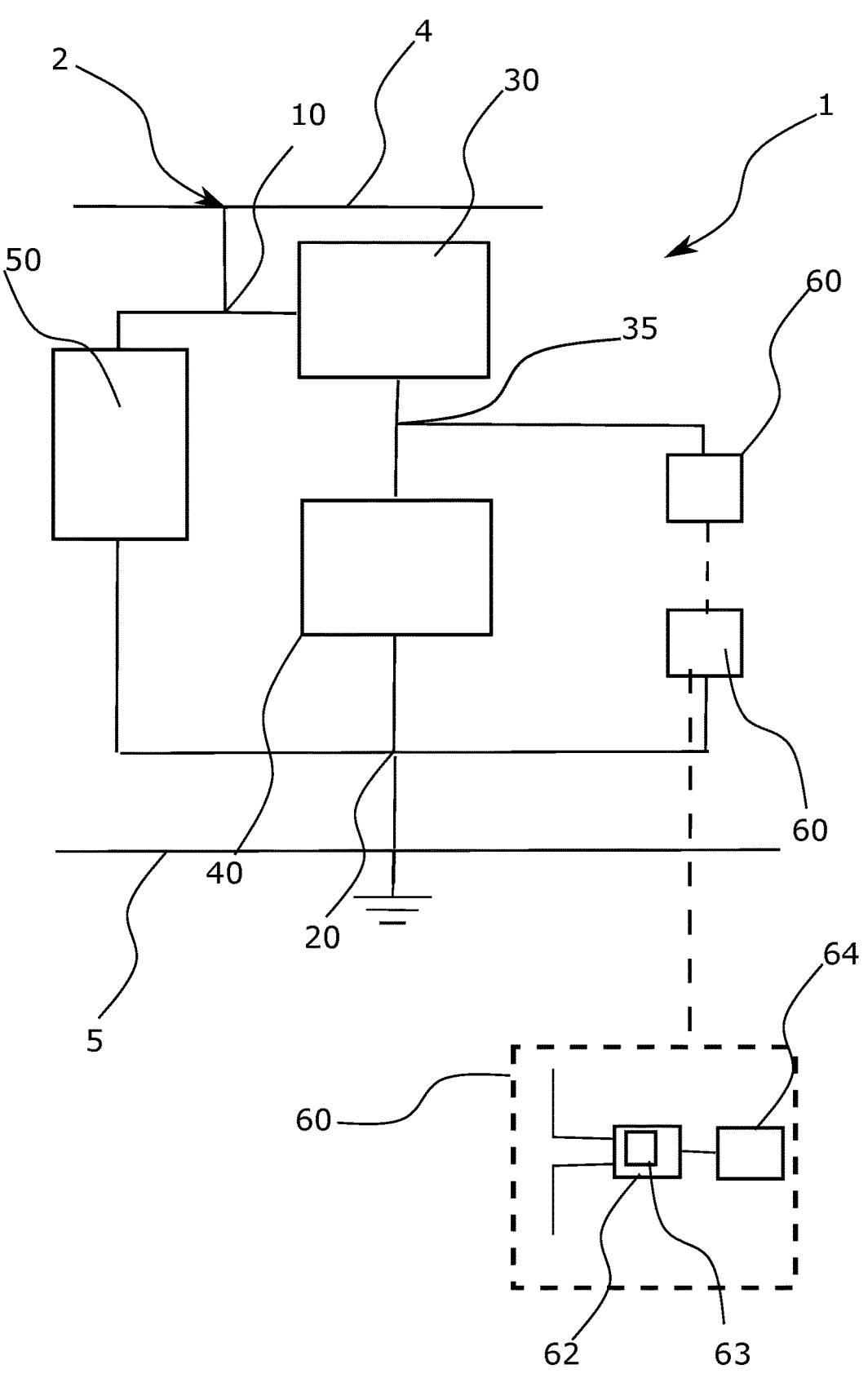
FIG. 1 illustrates an energy storage system and an enlarged figure of an energy storage device in a monopolar DC link.

FIG. 1 shows an energy storage system, ESS, 1 for a direct current, DC, transmission system, the energy storage system 1 being configured to be connected to a DC link 2 of the DC transmission system. The DC link may be a monopolar DC link with a positive pole 4. Other kinds of DC links are feasible as well, such as different kinds of monopolar and bipolar DC links. The energy storage system 1 may be used in either a Medium Voltage Direct Current, MVDC, transmission system or in a High Voltage Direct Current, HVDC, transmission system. By connecting the energy storage system 1 to the DC link it is possible to provide energy supporting functions such as absorbing energy by charging when there is surplus power in the DC transmission system or to discharge and provide power to the DC transmission system when there is a shortage of power. Thus, the energy storage system 1 may act to balance the DC transmission system when there is a sudden change of the power balance, for instance due to an AC/DC converter providing inertia emulation to the AC system.

The energy storage system 1 comprises a first system terminal 10 and a second system terminal 20. The first system terminal 10 is configured to be connected to the positive pole 4 of the DC link 2. The second system terminal 20 is configured to be connected to the ground 4. A first converter 30 is connected to the first system terminal 10. A second converter 40 is connected to the first converter 30 and the second system terminal 20. The first and second converters 30, 40 are interconnected at an interconnection point 35. The first converter 30 and the second converter 40 are in this embodiment modular multilevel converters, where the first converter 30 has a full-bridge arrangement and the second converter 40 has a half-bridge arrangement. The modular multilevel converters are suitable as they offer a high quality of the output performance and a low requirement on voltage rating and current rating of the power switches. However, in other embodiments other types of converters may be used and both converters may be full-bridge arrangement or half-bridge arrangement. The skilled person is able to adapt the converters to the requirements of a DC link and a DC transmission system.

An AC loop device 50 is connected to the first system terminal 10 and to the second system terminal 20 and in parallel with the first converter 30 and the second converter 40, the AC loop device 50 providing an alternating current, AC, path. Preferably, the AC loop device 50 has a low impedance to the specific AC current frequency. The AC path provides an AC loop in which the AC current may flow to balance the first converter 30 with the second converter 40, which will be further described in connection to FIG. 2.

A plurality of energy storage devices 60 are connected in parallel with the second converter 40 and in series with the first converter 30. Thus, the plurality of energy storage devices 60 are connected to the interconnection point 35, either directly or via additional components, as will be exemplified below, and to the second system terminal 20, either directly or via additional components. Each energy storage device 60 comprises a cell 62 having power electronic switches 63, and an energy storage element 64 connected to the cell 62, wherein the cells 62 are individually switchable. The plurality of energy storage devices 60 comprises a branch of several energy storage devices 60 connected in series. The plurality of energy storage devices 60 may also comprise a plurality of branches, with energy storage devices 60 connected in series, that are, in turn, connected in parallel to each other. With several energy storage devices 60 in different configurations, it is also possible to design the energy storage system 1 to be applicable in different designs of DC transmission systems. As an example, the energy storage system 1 may be designed with the number of energy storage devices 60 needed in series as a branch to achieve the required voltage rating. To adapt the energy storage system 1 to the energy storage requirements of the DC transmission system there may be several branches, each with energy storage devices 60 in series, connected in parallel.

In this embodiment the power electronic switches 63 of each cell 62 are arranged as a full-bridge arrangement as it spreads the stress over four power electronic switches instead of two. However, in other embodiments they may be half-bridge arrangements. The power switches 63 provide controllability of the energy storage elements 64 which allows them to be individually switchable. The energy storage elements 64 are adapted to fit the DC transmission system in which they are operating. As an example, super capacitors have a rapid charge and discharge time which result in that super capacitors can provide a burst of power when there is a shortage in a DC transmission system. Therefore, super capacitors may be suitable in a DC transmission system where a high quick burst of power is required from the energy storage devices 60. Super capacitors are also suitable in energy storage systems 1 where the temperature differs as super capacitors may operate in a wide range of temperatures. As another example, in DC transmission system where there is a need that the energy storage system 1 provide power over a longer period of time, batteries may be suitable. Batteries are able to store relatively big volumes of energy with a low loss over time.

The operability of the energy storage devices 60 being individually switchable results in that the energy storage devices 60 can be provided in a distributed manner. Distributed energy storage devices 60 have the possibility to just operate with a few of the energy storage devices 60 and to switch them between rest and operation one by one. This is advantageous as it allows the energy storage system 1 to adapt the voltage provided by the plurality of energy storage devices 60. For instance, the DC voltage across the plurality of energy storage devices 60 can be controlled to be considerably lower than the full DC voltage of the DC transmission system, and the number of energy storage devices 60 can be kept at a reasonable level. Furthermore, the plurality of energy storage devices 60 is able to replace the voltage drop due to the loss of state of charge of the already operating energy storage devices 60 as it is possible to switch another energy storage device 60 to start operating, thereby the energy storage devices 60 allow a fuller depletion of the state of charge which results in a more efficient usage of the energy storage devices 60. In other words, the voltage delivered by the energy storage system 1 will have a low dependency on the lowest allowed state of charge of each energy storage devices 60. Thus, a degree of freedom is introduced for the energy storage system 1. This degree of freedom allows the number of energy storage devices 60 in the energy storage system 1 to be reduced while still providing the same amount of energy support to the DC transmission system. By reducing the number of energy storage devices 60 a more cost-efficient energy storage system 1 may be provided. A larger flexibility when designing the energy storage system is achieved as well. The individually switchable energy storage devices 60 also allow the voltage of the energy storage system 1 to reach higher values which result in higher power capabilities for the energy storage system 1.

Figure 2:
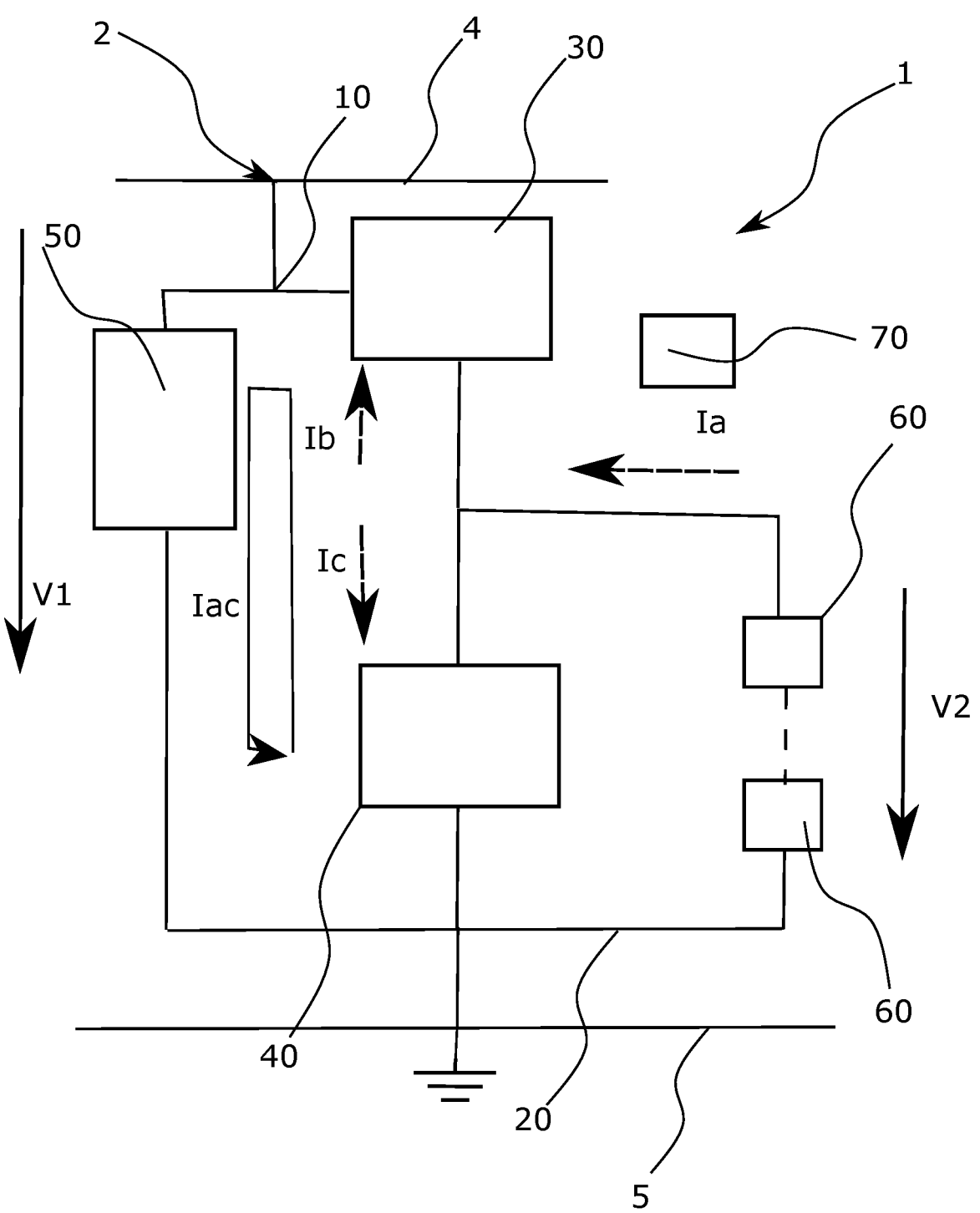
FIG. 2 illustrates some voltages and currents occurring in the energy storage system.

Turning to FIG. 2, some operating voltages and currents of the energy storage system 1 will be described. In FIG. 2 the energy storage system 1 further comprises an energy storage device controller 70. The energy storage device controller 70 may be used for control of the plurality of energy storage devices 60 such that the energy storage device controller 70 controls each cell 62 to insert or bypass the energy storage element 64 such that an energy exchange between the DC transmission system and the plurality of energy storage devices 60 is controlled in an efficient way. The energy storage device controller 70 may control the energy storage devices 60 based on information such as, for instance, the state of charge of each energy storage device 60, or/and the power balance in the DC transmission system. The energy storage device controller 70 may be capable of communicating with other components in the DC transmission system if needed. One example of such component could be a chopper resistor controller. It may be advantageous to use information from other components to achieve an efficient control of the energy storage system 1.

The first converter 30 and the second converter 40 are configured to control a first direct current, DC, voltage V1 between the first system terminal 10 and the second system terminal 20 and a second DC voltage V2 between their interconnection point and the second system terminal 20. The first DC voltage V1 may be the pole voltage of the DC link and will be the voltage that is provided across the first and second converters 30, 40. The second DC voltage V2 is the voltage across the second converter 40 and also the plurality of energy storage devices 60. When the energy storage devices 60 are activated and, for example, provide power to the DC transmission system, an output DC current Ia from the plurality of energy storage devices 60 will be divided, into a first DC current Ib and a second DC current Ic, between the first converter 30 and the second converter 40. The output DC current Ia is controlled to control the discharging of the plurality of energy storage devices 60 and this results in a modulated DC voltage in each converter 30, 40. However, the divided output DC current Ia results in that the power flow will be different for the two converters. Therefore, there will be a power imbalance issue between the first converter 30 and the second converter 40 due to that the current flows through the converters 30, 40 in opposite directions. While energy is extracted from the first converter 30, energy is inserted into the second converter 40. Therefore, the AC path is provided by the AC loop device 50. At least one of the first converter 30 and the second converter 40 generates an AC current Iac that is allowed to circulate between the first converter 30 and the second converter 40 and through the AC loop device 50 to obtain the opposite, i.e. to extract energy from the second converter 40 and insert energy into the first converter 30. This results in that also an AC voltage that is 180° shifted between the first converter 30 and the second converter 40 is modulated by the converters 30, 40. The AC current Iac allows a power transfer between the first converter 30 and the second converter 40 which results in that the converters can be balanced when an imbalance in the power balance between the converters occur due to the difference in direction and level of the first DC current Ib and the second DC current Ic.

The output voltage of the plurality of energy storage devices 60 may be controlled to follow the second DC voltage V2 and the AC voltage to prevent an AC current from entering the energy storage devices 60.

As would be to the person skilled in the art, other states of discharging and charging are of course occurring. One example is the opposite of what has been described above, i.e. that the plurality of energy storage devices 60 is generally being charged, and the power balancing of the first and second converters 30, 40 is the opposite such that the circulated AC current Iac causes a power transfer from the first converter 30 to the second converter 40.

It should also be noted that the cells 62 of the energy storage devices 60 may be individually controlled such that, simultaneously, some of the individual energy storage elements 64 are being charged, some are being discharged, and some are being bypassed, or any other combination of these states.

Figure 3:
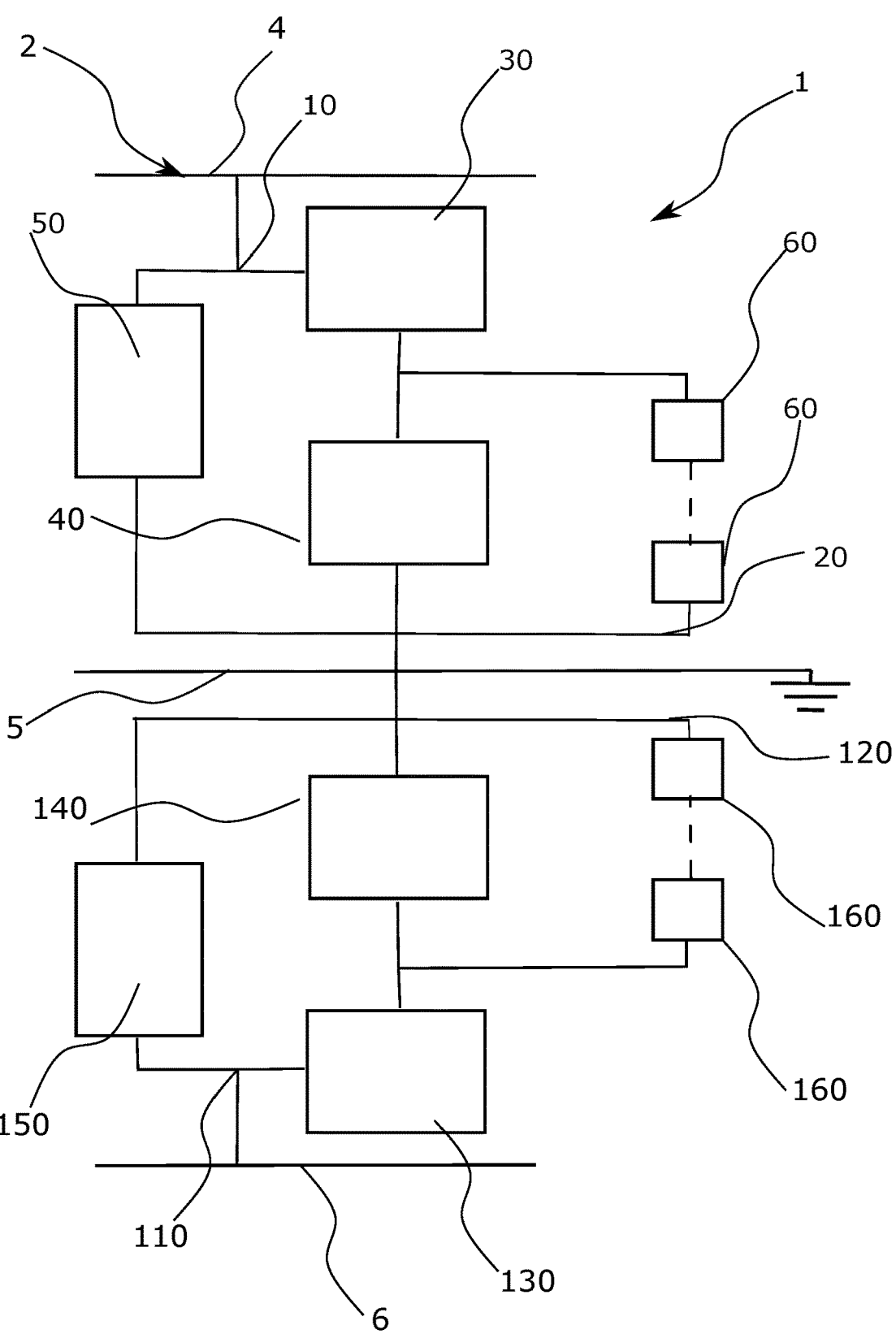
FIG. 3 illustrates an energy storage system in a bipolar DC link.

Turning to FIG. 3, an energy storage system for a bipolar DC link is shown. In other embodiments the bipolar DC link may be other types of DC links that have two poles and ground. In FIG. 3 the energy storage system is configured to be connected to a DC link 2 with a positive first pole 4 and a negative second pole 6. To achieve that the energy storage system 1 is provided with a first converter 30 and a second converter 40, an AC loop device 50 and a plurality of energy storage devices 60. These components are connected similar as the energy storage system 1 discussed in FIG. 1. The first converter 30 is connected to the first system terminal 10 that is configured to be connected to the positive first pole 4 of the DC link 2. The second converter 40 is connected to the second system terminal 20 which is configured to be connected to the ground 5. Alternative connections for the second system terminal 5 may, for instance, be solid grounding, high-impedance grounding or floating. The energy storage system 1 further comprises a third converter 130, a fourth converter 140, a further AC loop device 150 and a further plurality of energy storage devices 160, which are interconnected similar to the first converter 30, the second converter 40, the AC loop device 50 and the plurality of energy storage devices 60. The energy storage system 1 further comprises a third system terminal 110 and a fourth system terminal 120, similar to the first 10 and second 20 system terminals. The third system terminal 110 is connected to the negative second pole 6, and the fourth system terminal 120 is connected to ground 5. This configuration of the energy storage system 1 is a second set of components that allow the energy storage system 1 to have an additional pole to ground connection. The third converter 130, the fourth converter 140 and the further plurality of energy storage devices 160 allow the energy storage system 1 to act in not only monopolar DC links but also in bipolar DC links and homopolar DC links. Thus, extra flexibility of where the energy storage system 1 may be used is introduced. When the energy storage system 1 is grounded it also allows for independent operation of each pole when attached to a bipolar DC link.

Figure 4:
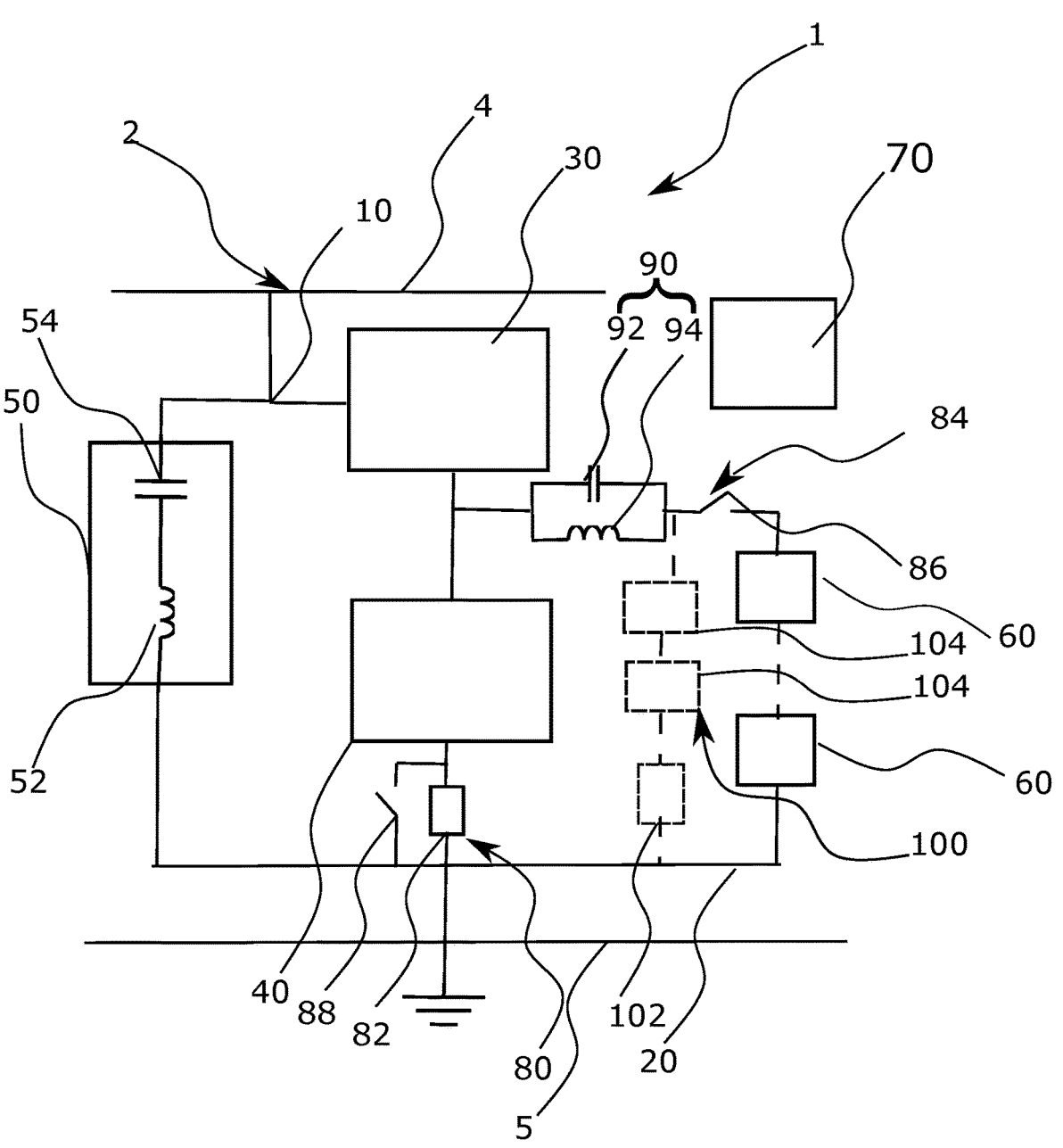
FIG. 4 illustrates an energy storage system having a combination of alternative components.

Turning to FIG. 4, the energy storage system 1 of FIG. 1 is disclosed with additional components that may be used in some embodiments to further improve the energy storage system 1. It should be noted that these additional components illustrated in FIG. 4 may be added one and one or in combination, but for sake of efficiency and understanding of the application all of them are disclosed in one figure. The components described in earlier figures will not be described again.

The energy storage system in FIG. 4 may further comprise a braking device 80, comprising a braking resistor 82 arranged in parallel to the plurality of energy storage devices 60, and in series with the second converter 40, and a switching structure 84 configured to disconnect the plurality of energy storage devices 60 and to redirect a current to flow through the resistor 82. The switching structure 84 comprises a first switch 86 connected in series with the plurality of energy storage devices 60, and a second switch 88 connected in parallel to the braking resistor 82. In a case where the plurality of energy storage devices already has a state of charge of 100% and there is excess energy in the DC transmission system the braking device 80 may redirect the excess power to the braking resistor 82. The second switch 88 is closed during ordinary operation, thereby bypassing the braking resistor 82. It is advantageous that the energy storage system 1 is able to dissipate power from the DC transmission system also when the plurality of energy storage devices 60 is fully charged. However, the braking resistor 82 may also be used when the excess power in the DC transmission system is more than the plurality of energy storage devices 60 is able to handle. In such a case the braking device 80 may be used to connect the energy storage devices 60 as well as the braking resistor 82, thereby dissipating further power. The braking device 80 may be controlled by the energy storage device controller 70 to achieve an efficient control of the energy storage system 1.

As an alternative, shown in broken lines in FIG. 4, the braking device 100 may comprise a braking resistor 102 arranged in parallel to the plurality of energy storage devices 60 and a switching structure 84 comprising the first switch 86 and power electronic switches 104. The power electronic switches 104 are connected in series with the braking resistor 102, constituting a so called chain-link. Thus, the chain-link is connected in parallel with the series connection of the first switch 86 and the plurality of energy storage devices 60.

The AC loop device 50, as well as the further loop device 150, may comprise an inductor 52 and a capacitor 54 connected in series. With the inductor 52 and the capacitor 54 in the AC loop device 50 a filter is provided. The filter may be tuned at a desired AC frequency corresponding to the frequency of the circulated AC current. A tuned filter is advantageous as it may improve the harmonic performance by reducing harmonic voltage and current distortion. Hence, unwanted frequencies may be reduced or generally removed. The loop device 50 and the further loop device 150 may comprise at least one of an arrangement of passive elements, and an arrangement of active elements. For instance, each one of the loop device 50 and the further loop device 150 may individually comprise an inductor and a capacitor connected in series, an inductor and several cells connected in series, or an inductor, a capacitor and several cells connected in series. The cells may be used for tuning the frequency where it provides low impedance to the circulated AC current. Similarly, a combination of an inductor and a capacitor forms an AC frequency tunable filter.

The energy storage system 1 may, in all configurations, further comprise an alternating current, AC, rejecting circuit 90 connected in series with the plurality of energy storage devices 60 between the energy storage devices 60 and the first converter 30 and the second converter 40. The AC rejecting circuit 90 may be used to prevent the circulated AC current from entering the energy storage devices 60. The AC rejecting circuit 90 may be advantageous as it provides a protection of the energy storage devices 60 and also removes the must that the output voltage of the energy storage devices 60 follows the AC voltage to restrict the AC current from entering the energy storage devices 60. The AC rejecting circuit 90 may be designed as a trap filter with an inductor 94 and a capacitor 92 that are connected in parallel, or with additional and alternative components, such as cells.

Figure 5:
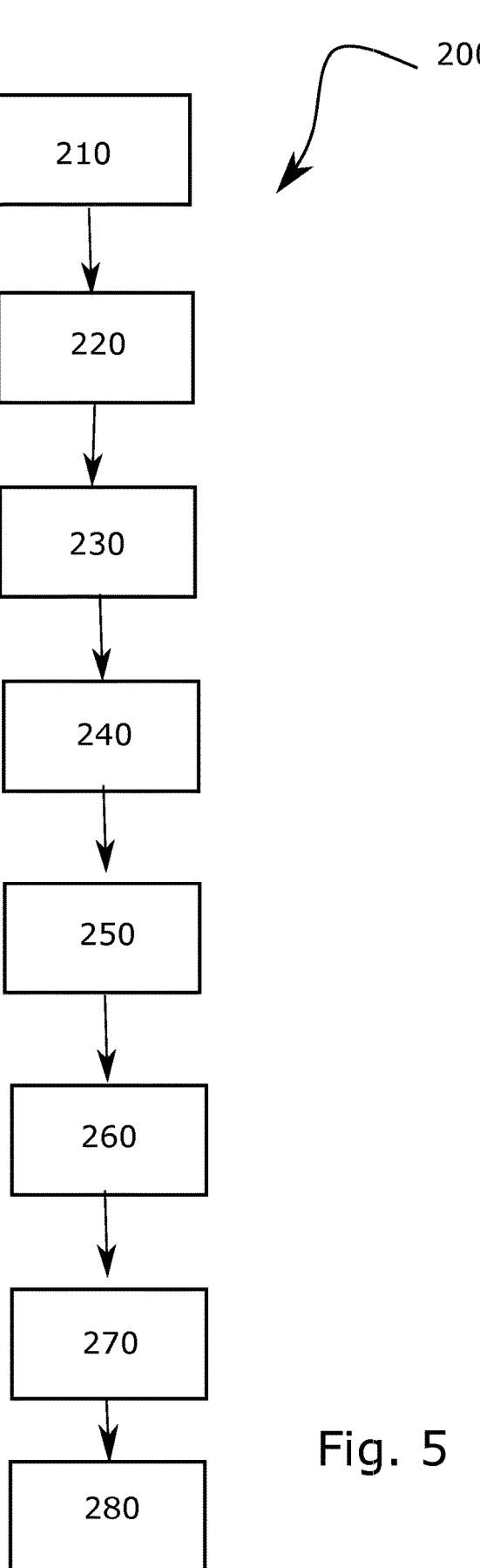
FIG. 5 illustrates a method for provide energy storage to a DC transmission system.

Turning to FIG. 5, a method 200 for exchanging energy with a direct current, DC, transmission system, by means of an energy storage system 1 configured to be connected to a DC link 2 of the DC transmission system is provided. The energy storage system 1 used for the method may be any one of the embodiments in FIGS. 1-4 or another combination.

The method 200 comprises absorbing 210 energy from the DC transmission system by controlling at least one of the plurality of energy storage devices 60 to absorb energy in the energy storage element 64.

The method 200 further comprises releasing 220 energy to the DC transmission system from the energy storage system 1 by controlling at least one of the energy storage devices 60 to release energy from the energy storage element 64.

The method may further comprise controlling 230 a first DC voltage V1 between the first 10 and second 20 system terminals and a second DC voltage V2 between an interconnection point 35 of the first 30 and second 40 converters and the second system terminal 20 by means of the first and second converters 30, 40.

The method may further comprise controlling 240 a first AC voltage across the first converter and a second AC voltage across the second converter.

The method may further comprise controlling 250 each cell 62 to insert or bypass the energy storage element 64 such that a power exchange with the plurality of energy storage devices 60 is controlled and such that a total output voltage of the plurality of energy storage devices 60 is adapted to the second DC voltage V2 and the second AC voltage.

The method may further comprise generating 260 an AC current and circulating 270 the AC current through the first 30 and second 40 converters and the AC loop device 50.

The method may further comprise controlling 280 a total voltage across the energy storage devices 60 to follow the variations of an amplitude of a modulated AC voltage across the second converter 40.

The first and second AC voltages across the first and second converters 30, 40, respectively, are modulated such that the second AC voltage is 180 degrees phase shifted relative to the first AC voltage. Thereby, the first and second AC voltages interact with the circulated AC current Iac to obtain the draining of energy from capacitors inherent in submodules, or cells, in the second converter 40 and injecting the same amount of energy in the capacitors of the first converter 30.

The person skilled in the art realizes that the present disclosure by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. An energy storage system for a direct current (DC) transmission system, the energy storage system being configured to be connected to a DC link of the DC transmission system, the energy storage system comprising:

a first system terminal and a second system terminal, a first converter connected to the first system terminal, a second converter connected to the first converter and the second system terminal, an alternating current (AC) loop device connected to the first system terminal and to the second system terminal and in parallel with the first and second converters, the AC loop device providing an alternating current (AC) path, and a plurality of energy storage devices connected in parallel with the second converter and in series with the first converter, wherein each energy storage device comprises a cell having power electronic switches, and an energy storage element connected to the cell, wherein the cells are individually switchable.

2. The energy storage system according to claim 1, comprising an energy storage device controller, wherein the first and second converters are configured to control a first direct current (DC) voltage between the first and second system terminals and a second DC voltage between their interconnection point and the second system terminal, and to control first and second alternating current (AC) voltages across the first and second converters, respectively, and wherein the energy storage device controller is configured to control each cell to insert or bypass the energy storage element such that a power exchange with the plurality of energy storage devices is controlled and such that an energy storage voltage, being a total output voltage of the plurality of energy storage devices, is adapted to the second DC voltage and the second AC voltage.

3. The energy storage system according to claim 1, wherein at least one of the first and second converters generate an AC current that is allowed to circulate through the first and second converters, and through the AC loop device.

4. The energy storage system according to claim 1, wherein each of the first and second converters is a modular multilevel converter.

5. The energy storage system according to claim 1, wherein the AC loop device comprises at least one of an arrangement of passive elements, and an arrangement of active elements.

6. The energy storage system according to claim 1, wherein each energy storage element is a super capacitor and/or a battery.

7. The energy storage system according to claim 1, further comprising a braking device comprising a braking resistor arranged in parallel to the plurality of energy storage devices, and a switching structure comprising a first switch connected in series with the plurality of energy storage devices, and a second switch connected in parallel to the braking resistor, wherein the braking device is configured to disconnect the plurality of energy storage devices and to redirect a current to flow through the braking resistor.

8. The energy storage system according to claim 1, further comprising a braking device comprising a braking resistor arranged in parallel to the plurality of energy storage devices and a switching structure comprising the first switch, connected in series with the plurality of energy storage devices, and power electronic switches, wherein the power electronic switches are connected in series with the braking resistor.

9. The energy storage system according to claim 1, wherein the plurality of energy storage devices comprises a branch of several energy storage devices connected in series.

10. The energy storage system according to claim 1, further comprising an alternating current (AC) rejecting circuit connected in series with the plurality of energy storage devices between the energy storage devices and the first and second converters.

11. The energy storage system according to claim 1, wherein the DC link has a first pole and a second pole, the energy storage system further comprising a third converter, a fourth converter and a further plurality of energy storage devices, which are interconnected similar to the first converter, the second converter and the plurality of energy storage devices, and comprise a third system terminal and a fourth system terminal, similar to the first and second system terminals, respectively, wherein the first system terminal is connected to the first pole, the second system terminal to ground, the third system terminal is connected to the second pole, and the fourth system terminal is connected to ground.

12. A method for exchanging energy with a direct current (DC) transmission system, by means of an energy storage system configured to be connected to a DC link of the DC transmission system, wherein the energy storage system comprises:

a first system terminal and a second system terminal, a first converter connected to the first system terminal, a second converter connected to the first converter and the second system terminal, an AC loop device connected to the first system terminal and to the second system terminal and in parallel with the first and second converter, the AC loop device providing an alternating current (AC) path, and a plurality of energy storage devices connected in parallel with the second converter and in series with the first converter, wherein each energy storage device comprises a cell having power electronic switches, and an energy storage element connected to the cell, wherein the cells are individually switchable, the method comprising:

absorbing energy from the DC transmission system by controlling at least one of the plurality of energy storage devices to absorb energy in the energy storage element, and releasing energy to the DC transmission system from the energy storage system by controlling at least one of the energy storage devices to release energy from the energy storage element.

13. The method according to claim 12, comprising:

controlling a first DC voltage between the first and second system terminals and a second DC voltage between an interconnection point of the first and second converters and the second system terminal by means of the first and second converters, controlling a first AC voltage across the first converter and a second AC voltage across the second converter, and controlling each cell to insert or bypass the energy storage element such that a power exchange with the plurality of energy storage devices is controlled and such that a total output voltage of the plurality of energy storage devices is adapted to the second DC voltage and the second AC voltage.

14. The method according to claim 12, comprising:

generating an AC current; and circulating the AC current through the first and second converters and the AC loop device.

15. The method according to claim 14, comprising controlling a total voltage across the energy storage devices to follow the variations of an amplitude of a modulated AC voltage across the second converter.

\* \* \* \* \*